Dec. 25, 1962    J. W. TUMAVICUS    3,069,851
PROPELLANT SUPPLY SYSTEM FOR ROCKETS
Filed June 25, 1959    2 Sheets-Sheet 1
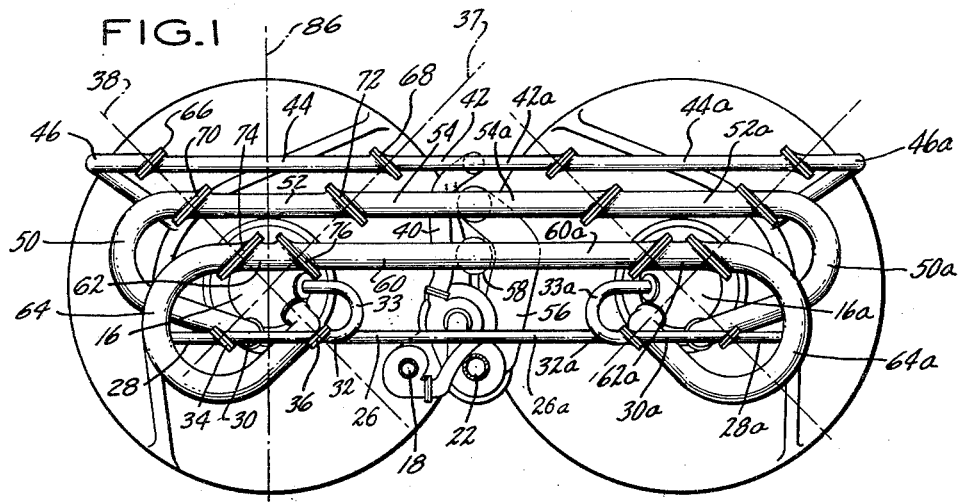
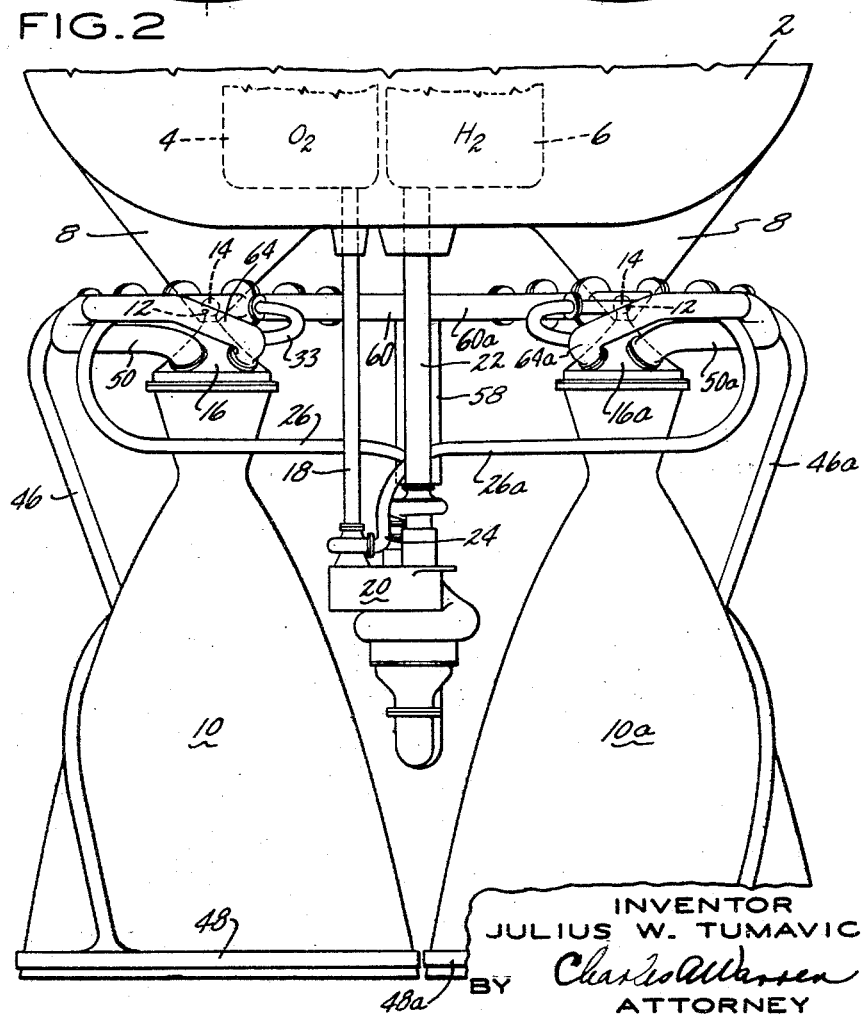
INVENTOR
JULIUS W. TUMAVICUS
BY Charles Warren
ATTORNEY Dec. 25, 1962   J. W. TUMAVICUS   3,069,851
PROPELLANT SUPPLY SYSTEM FOR ROCKETS
Filed June 25, 1959   2 Sheets-Sheet 2

INVENTOR
JULIUS W. TUMAVICUS
BY *Charles Warren*
ATTORNEY

United States Patent Office 3,069,851
Patented Dec. 25, 1962

3,069,851
PROPELLANT SUPPLY SYSTEM FOR ROCKETS
Julius W. Tumavicus, Old Saybrook, Conn., assignor to United Aircraft Corporation, East Hartford, Conn., a corporation of Delaware
Filed June 25, 1959, Ser. No. 822,779
8 Claims. (Cl. 60—35.55)

This invention relates to a vectoring rocket and particularly to an arrangement for supplying propellants to or pressure signals to or from the rocket.

One feature of the invention is the ducting of one or more propellants or pressure signals between the supporting structure or vehicle and the vectoring rocket without substantially limiting the vectoring movement. Another feature is a ducting arrangement which avoids the use of flexible conduit for the propellant. Another feature is an arrangement for ducting a plurality of propellants from the supporting structure through a number of ducts with suitable couplings to permit vectoring of the rocket without distortion of the ducting and with a minimum length of ducting.

In certain rocket installations where the propellant tanks and pumps are carried by the vehicle, several individual vectoring rockets are used by which to obtain pitch and yaw control and also, frequently to obtain roll control thus necessitating vectoring of the rocket in any direction. One feature of this invention is a piping arrangement for ducting the propellants from the tank and supply pumps to the vectoring nozzle without the use of flexible conduit and in such an arrangement as to permit the use of several supply pipes for the flow of more than one propellant.

Other features and advantages will be apparent from the specification and claims, and from the accompanying drawing which illustrates an embodiment of the invention.

FIG. 1 is a plan view of the pipe arrangement with the supporting brackets for the rockets being broken away substantially along the line 1—1 of FIG. 2.

FIG. 2 is a side elevation showing a pair of vectoring rockets mounted on the vehicle with the piping arrangement.

Figure 3:
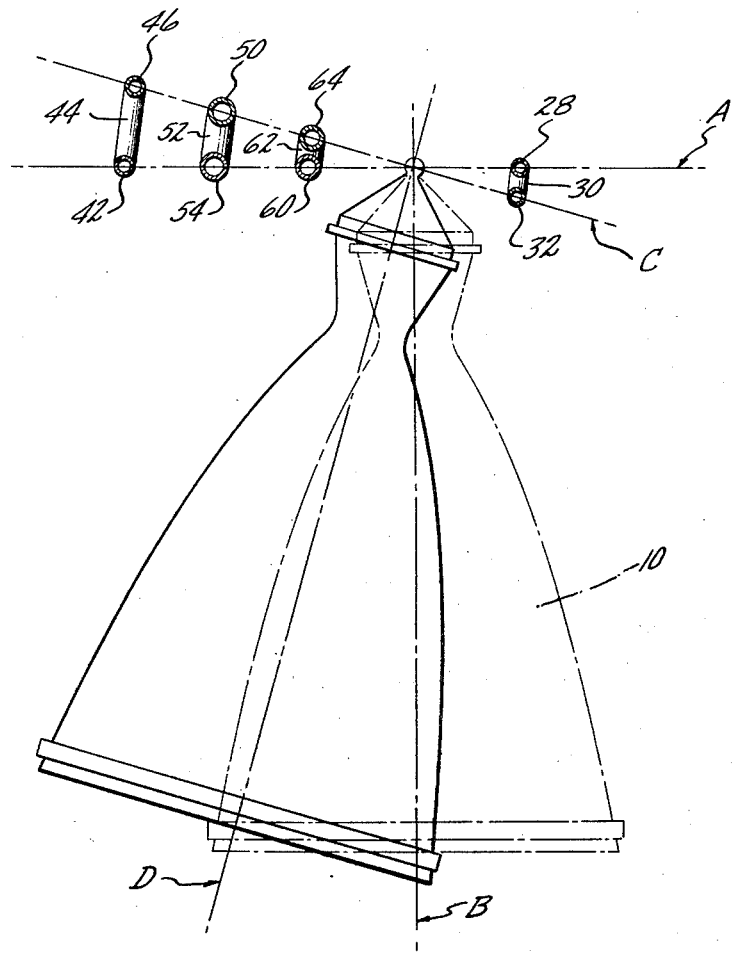
FIG. 3 is a diagrammatic view of the rocket in a vectored position.

Referring first to FIG. 2, the vehicle 2 which incorporates two propellant tanks 4 and 6 carries on the underside thereof mounting brackets 8 each of which supports a rocket 10 or 10a. The connection between the rockets and the brackets 8 is preferably a joint permitting universal vectoring of the rocket and may be, accordingly, a ball and socket joint, FIG. 3. Thus the bracket 8 may carry a socket 12 to receive a ball 14 on the head 16 or 16a of the rocket.

The mechanism for causing vectoring of the rockets with respect to the vehicle is not a part of the present invention, is not essential to the understanding of it and is therefore not shown and described. It is sufficient to note that the ball and socket provide a pivot point for the rocket, this pivot point being the center of the ball 14.

The arrangement shown is intended for use in the delivery of two propellants to the two rockets. As shown, the tank 4 carries an oxidizer which is delivered through a conduit 18 to the turbopump assembly 20. The other tank 6 carries a fuel which is delivered through the conduit 22 to the turbo-pump assembly. The particular configuration of the turbo pump is not a part of this invention and will not be described in detail. It is sufficient to note that, in this arrangement, the expansion of the fuel through the turbine is utilized for driving both the fuel pump and the oxidant pump for feeding these propellants into the injector head. The normal tank pressure is sufficient to deliver the fuel through the ducting hereinafter described and into the turbine.

From the oxidizer duct 18 this propellant is delivered by the turbo-pump assembly to a pressure conduit 24 which divides into two conduits 26 and 26a leading to the rocket heads 16 and 16a for the two rockets. The pipes 26 and 26a curve upwardly to provide a delivery duct end 28 or 28a, FIG. 1, which is in a plane including the pivotal point of the rocket. Connecting ducts 30 and 30a establish fluid connections between the delivery duct ends 28 and 28a and receiving duct ends 32 and 32a which are in a plane that passes through the pivot point for the rocket and, when the rockets are unvectored, that is to say, when the rocket axis is parallel to the vehicle axis, the plane of the receiving duct end 32 and the plane of the delivery duct 28 coincide. The duct ends 32 and 32a connect through curved ducts 33 and 33a with the rocket heads for the delivery of the oxidizer thereto.

When the rocket is unvectored, the full line position of FIGS. 1 and 2, the delivery duct end 28 (or 28a) is in alignment with the receiving duct end 32 (or 32a) and both ends are tangent to an imaginary circle whose axis coincides with the pivot point, that is, the center of ball 14. The connecting duct 30 (or 30a) is a straight short section of ducting which, when the rocket is unvectored, forms a short direct connection between duct ends 28 and 32 and also is tangent to the same imaginary circle.

For the purpose of identifying the planes of the receiving and delivery duct ends, the rocket 10 is shown in FIG. 3 in vectored position such that the relatively fixed and relatively movable elements may be shown more clearly. Thus the delivery duct end 28 is shown in the plane A which is at right angles to the normal axis B of the rocket. This axis B is parallel to the axis of the vehicle and, as shown, this duct end 28 is fixed with respect to the vehicle, and remains in this plane A when the rocket is vectored. The cooperating duct receiving end 32 moves with the rocket 10 and is so supported that it will be in a plane C at right angles to the rocket axis D regardless of the position of the rocket. Both planes A and C pass through the pivot for the rocket and both planes A and C coincide when the rocket axis D and the unvectored axis B coincide.

In order to permit vectoring of the rocket in any direction without affecting the piping, the duct ends 28 and 32 have swivel connections 34 and 36, respectively, with the connecting duct 30. Each of these swivel connections has a swiveling axis which passes through the pivot for the rocket, as for example, the axis represented by the line 37, FIG. 1, for the swivel connection 34 and the axis represented by the line 38 for the swivel connection 36. Not only are the axes for the swivel connections on lines passing through the pivot for the rocket, but these axes lie at right angles to each other, as shown in FIG. 1. By complying with these requirements, it is possible for the rocket to pivot about its pivot point to a sufficient angle for vectoring without affecting the positions of the duct ends 28 and 28a which are immovable with respect to the vehicle and the duct ends 32 and 32a which are immovable with respect to the rocket structure. It will be apparent that axis 37 is in plane A and axis 38 is in plane C.

For the purpose of clarification, it will be noted that should the rocket be vectored in a direction such that the rocket is in effect vectoring about the axis 37, the swiveling connection 34 will permit this vectoring movement and the connection 36 will have no relative motion. If, on the other hand, the rocket is vectored so that in effect it is pivoting on the axis represented by the line 38, the swivel connection 36 will permit this movement. Obviously, vectoring movement of the rocket in any other direction will involve movements of both joints 34 and 36 but such will obviously be possible.

Since the duct ends 28 and 32 are tangent to a circle whose axis coincides with that of ball 14, and since the connecting duct 30 is also tangent to the same circle, it will be apparent that the swivel joints 34 and 36 must of necessity have their axis at an angle to the duct in order that these axes may pass through the pivotal axis for the nozzle. In the arrangement shown, the axes of the swivel joints 34 and 36 make an angle of 45° with the longitudinal axis of the duct ends 28 and 32 and of the connecting duct 30.

The same type of arrangement may be used for the supply of another propellant such as the fuel. From the turbo-pump assembly 20 the fuel supplied thereto by the duct 22 flows upwardly through a duct 40 to branch into opposed conduits 42 and 42a located in the plane A. These ducts have delivery ends which are connected by duct connections 44 and 44a to ducts 46 and 46a, the ends of which are in the plane C, which as above stated, is at right angles to the rocket axis D and which, when the rocket is unvectored, coincides with the plane A. The ducts 46 and 46a deliver the fuel to manifolds 48 and 48a surrounding the discharge end of the rocket and from this manifold the fuel may flow through the rocket wall to be returned to the turbo-pump. This return ducting includes ducts 50 and 50a, the delivery ends of which are in the plane C and are connected by duct connections 52 and 52a to ducts 54 and 54a, the receiving ends of which are located in the plane A, as will be apparent, since these ducts are supported in position by a duct 56 between the ducts 54 and the turbo-pump.

The fuel returned to the turbo-pump for driving the turbine is discharged from the turbo-pump through an upright duct 58 which divides into opposed ducts 60 and 60a located in plane A, as will be apparent. The delivery ends of ducts 60 and 60a have duct connections 62 and 62a for delivery of the fuel to ducts 64 and 64a which are attached to the rocket head. The receiving ends of the ducts 64 and 64a are in the plane C, as will be apparent, since these ducts are mounted on the rocket.

The connecting duct 44 has swivel connections 66 and 68 at opposite ends by which this duct connector may be attached to the adjacent ducts 46 and 42, respectively, and these swivel connections have swiveling axes coinciding with the lines 38 and 37, respectively. Similarly, the duct connection 52 has swivel connections 70 and 72 swiveling on axes represented by lines 38 and 37, respectively. The duct connection 62 has swivel connections 74 and 76 also located and arranged in a similar manner. The swiveling axis for each of these swivel connections lies on the same axis 38 or 37 that passes through the swivel connection.

So long as the ducts have swivel connections therein swiveling on axes extending through the pivot for the rocket and so long as there are two swivel connections in each duct with the axes of the respective connections at right angles to each other, it will be clear that vectoring of the rocket to the extent required by the installation may occur without distortion of the ducting and without imparting any undesirable stresses on the several ducts.

Figure 4:
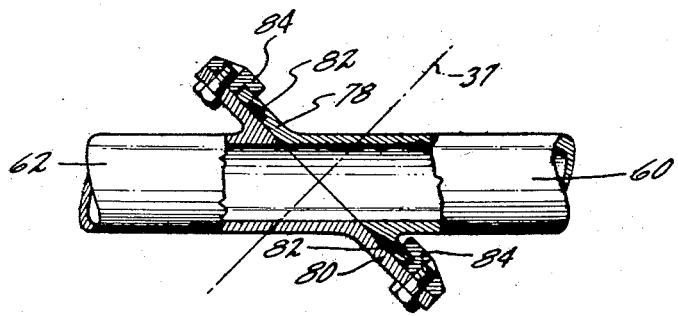
FIG. 4 is a detail of one of the swivel joints.

One type of swivel joint for use in this arrangement is shown in detail in FIG. 4 in which the duct end 60 carries flanges 78 on the end at a 45° angle to the center line of the duct. The connecting duct 62 associated therewith has a cooperating flange 80 also at an angle of 45° to the axis of the duct. The faces of these flanges are in contact and may have a sealing ring 82 therebetween. The flange 80 may carry a mounting ring 84 engaging over the periphery of the flange 78 to hold these two flanges in engagement but loosely enough to permit relative turning movement of one flange with respect to the other about the axis 37.

In the arrangement shown, the conduits are all arranged so that each connecting conduit 30, 44, 52 or 62 is tangent at its mid-point to an imaginary circle, the center of which coincides with the pivot for the rocket. Accordingly, the swiveling axes of the connections extend at an angle of 45° to a line 86 passing through the points of tangency of the connecting ducts.

From the construction of FIG. 1, it will be readily apparent that the swivel connections 34, 68, 72 and 76 all lie on and have their swiveling axes coincident with the line 37 that passes through the pivot for the rocket and also all lie in plane A. Thus, if the rocket swings about its pivot along an axis coinciding with the line 37 all of these swivel connections will function to maintain the necessary fluid connections between the turbo-pump and the rocket without distortion of any of the plumbing. Similarly, since the swivel connections 36, 66, 70 and 74 are located on and have their swiveling axes coincident with the line 38, the vectoring of the rocket about the axis represented by this line will be permitted by these several connections without distorting any of the plumbing. By reason of this possible vectoring movement about either axis 37 or 38, it will be understood that rocking movement about any other axis permitted by the pivotal mounting of the rocket will also be permissible since the pair of swivel joints in each propellant supply line will permit such rocking movement.

It is to be understood that the invention is not limited to the specific embodiment herein illustrated and described, but may be used in other ways without departure from its spirit as defined by the following claims.

I claim:

1. In a rocket propellant supply, a rocket including a combustion chamber and a nozzle, a supporting structure for the rocket including a propellant supply, cooperating means on said rocket and structure for supporting said rocket pivotally on said structure for vectoring movement of the rocket about the pivot point of said means, means for supplying a propellant to said nozzle including a delivery duct mounted on said structure and having a delivery end in fixed relation thereto, the axis of the duct at said end being tangent to a circle whose axis coincides with the pivot point, a receiving duct attached to and movable with said rocket and having a receiving end, the axis of said receiving duct at said receiving end, when the rocket is unvectored, being in alignment with the axis of said delivery duct at said delivery end and tangent to the same circle, a duct connection connected to and extending between said duct receiving and delivery ends and having ends, the axes of which are also tangent to the same circle, and swivel joints connecting the ends of said duct connection to said duct receiving and delivery ends, the axis of the swivel joints lying on radial lines passing through the pivot point.

2. A propellant supply as in claim 1 in which when the rocket is unvectored the axis of the rocket is parallel to the axis of the supporting structure and the axes of the duct delivery and receiving ends and the axes of the duct connection ends are all in a common plane.

3. A propellant supply as in claim 1 in which the swivel joints at opposite ends of the duct connection are spaced apart 90° with respect to the pivot point of the nozzle.

4. An arrangement as in claim 1 in which when the axis of the rocket is parallel to the axis of the supporting structure the planes of the duct axis at the delivery ends and of the duct axis at the receiving ends coincide.

5. A rocket propellant supply arrangement, including a rocket having a combustion chamber and a propellant duct thereon in fixed relation to said chamber, a supporting structure for said chamber having propellant supply means in fixed relation thereto, a pivotal mounting between said supporting structure and the combustion chamber to provide for vectoring movement of the chamber about a pivot point, a duct on said supporting structure connecting with said propellant supply means and having a delivery end, the axis of the duct at said delivery end being in a plane passing through said pivot point, a propellant duct on the chamber having a receiving end, the axis of the duct at the receiving end being in a plane including the pivot point, said receiving end being spaced substantially 90° from the delivery end, said planes substantially coinciding when the chamber is unvectored, and the axes of the ducts at the receiving and delivery ends being substantially in alignment, and a connecting duct from said delivery end to said receiving end with a swivel connection at each end of the connecting duct and with the axis for each swiveling connection lying in a line passing through the pivot point.

6. An arrangement as in claim 5 in which the duct delivery and receiving ends are equally spaced from the pivot point of the nozzle.

7. A rocket propellant supply arrangement, including a rocket having a combustion chamber and propellant ducts thereon, a supporting structure having propellant supply means in fixed relation thereto, a pivotal mounting between said structure and the rocket to provide for vectoring movement of the rocket about a pivot point, a plurality of supply ducts on said supporting structure, each supply duct having a delivery end in a plane passing through the pivot point for the rocket and all terminating along a radial line passing through said pivot point, said propellant ducts on the rocket having receiving ends in a plane including the pivot point for the rocket, said ends terminating along a radial line passing through said pivot point and at right angles to said first radial line and connecting ducts from said delivery ends to said receiving ends respectively, each connecting duct having a swiveling connection at each end with the associated delivery and receiving ends and with the axis for each swiveling connection coinciding with the radial line on which the connection is located.

8. An arrangement as in claim 7 in which, when the axis of the rocket is parallel to the axis of the supporting structure, the planes of the axes of the delivery ends and of the axes of the receiving ends coincide.

References Cited in the file of this patent

UNITED STATES PATENTS

| | | |
|---|---|---|
| 2,415,972 | Stinson | Feb. 18, 1947 |
| 2,621,871 | Robert | Dec. 16, 1952 |
| 2,933,891 | Britt | Apr. 26, 1960 |

FOREIGN PATENTS

| | | |
|---|---|---|
| 743,874 | Great Britain | Jan. 25, 1956 |

OTHER REFERENCES

Rocket Encyclopedia Illustrated, Areo Publications, published April 28, 1959 (pages 188–190 relied on).